United States Patent
Yamano et al.

(10) Patent No.: US 7,474,431 B2
(45) Date of Patent: Jan. 6, 2009

(54) NETWORK PRINTER HAVING PLURAL SLEEP MODES

(75) Inventors: Hiroshi Yamano, Kanagawa (JP); Masato Ochiai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 10/886,565

(22) Filed: Jul. 9, 2004

(65) Prior Publication Data
US 2005/0007628 A1    Jan. 13, 2005

(30) Foreign Application Priority Data
Jul. 10, 2003 (JP) ............... 2003-194887
Jul. 2, 2004 (JP) ............... 2004-196946

(51) Int. Cl.
G06F 3/12 (2006.01)
G06K 15/00 (2006.01)

(52) U.S. Cl. ............... 358/1.15; 358/1.14; 358/1.13

(58) Field of Classification Search ............... 358/1.15, 358/1.14, 1.13, 1.1, 437, 1.6, 1.18, 1.16, 358/1.17, 407, 468, 400, 401; 347/1, 2, 3, 347/5; 399/1, 8, 37; 101/484
See application file for complete search history.

(56) References Cited

U.S. PATENT DOCUMENTS

| | | | |
|---|---|---|---|
| 6,301,012 B1 * | 10/2001 | White et al. | ............... 358/1.15 |
| 7,057,754 B1 | 6/2006 | Tsuchiya et al. | |
| 7,113,294 B2 | 9/2006 | Katsu | ............... 358/1.14 |
| 2002/0134268 A1 * | 9/2002 | Yamada | ............... 101/484 |
| 2003/0103226 A1 | 6/2003 | Nishio | |

FOREIGN PATENT DOCUMENTS

| | | |
|---|---|---|
| JP | 05-338320 | 12/1993 |
| JP | 2000-335019 | 12/2000 |
| JP | 2001-180083 A | 7/2001 |
| JP | 2002-287936 A | 10/2002 |
| JP | 2003-054091 | 2/2003 |
| JP | 2003-089254 | 3/2003 |
| JP | 2003-167696 A | 6/2003 |
| JP | 2003-186653 | 7/2003 |
| JP | 2003-348112 A | 12/2003 |

OTHER PUBLICATIONS

Japanese Office Action dated Apr. 21, 2008 in corresponding Japanese Application No. 2004-196946.

* cited by examiner

*Primary Examiner*—Dov Popovici
(74) *Attorney, Agent, or Firm*—Fitzpatrick, Cella Harper & Scinto

(57) ABSTRACT

This invention simultaneously satisfies both power saving of a printing apparatus in a network system and the convenience of the operator who wants to print from a host computer. A printing control apparatus includes a processor which performs an image process for print data externally received via a network, a first interface including a monitoring unit which monitors, from external, reception of data with one of a plurality of types of patterns including a pattern containing communication information addressed to an unspecified apparatus and an identifier used for power control, and a communication controller which transfers externally transmitted data to the processor, and a power controller which powers on the processor when data with the pattern is received via the first interface.

9 Claims, 10 Drawing Sheets

FIG. 7

| ITEM | VALUE (Hex) | LENGTH |
|---|---|---|
| EtherFrame | | |
| DESTINATION ETHER ADDRESS | ★01:00:5e:7f:ff:fd | 6 |
| SOURCE ETHER ADDRESS | Don't Care | 6 |
| FRAME TYPE | ★0800(IP) | 2 |
| IP Frame | | |
| VERSION + DATA LENGTH | ★45 | 1 |
| TOS | Don't Care | 1 |
| DATA LENGTH | Don't Care | 2 |
| ID | Don't Care | 2 |
| FLAG | Don't Care | 2 |
| TTL | Don't Care | 1 |
| PROTOCOL ID | ★11(17) | 1 |
| CHECKSUM | Don't Care | 2 |
| SOURCE IP ADDRESS | Don't Care | 4 |
| DESTINATION IP ADDRESS | 239.255.255.253 | 4 |
| UDP Frame | | |
| SOURCE PORT NUMBER | Don't Care | 2 |
| DESTINATION PORT NUMBER | ★1ab(427) | 2 |
| UDP DATA LENGTH | Don't Care | 2 |
| UDP CHECKSUM | Don't Care | 2 |
| SLP V2Frame | | |
| UNIQUE FRAME PATTERN | ★WAKEUP FROM DEEP SLEEP! | |

NETWORK PRINTER HAVING PLURAL SLEEP MODES

CLAIM OF PRIORITY

This application claims priority from Japanese Patent Application No. 2003-194887 filed on Jul. 10, 2003 and Japanese Patent Application No. 2004-196946 filed on Jul. 2, 2004 which are hereby incorporated by reference.

FIELD OF THE INVENTION

The present invention relates to a printing control apparatus and, more particularly, to power saving control of a printing control apparatus which prints out information such as a character, figure, raster image on the basis of information from a host apparatus via a network.

BACKGROUND OF THE INVENTION

There is generally known a printing apparatus which is connected to a network and prints out in accordance with a print request from a client machine. Further power saving in the printing apparatus is desired in terms of both the power cost and environment.

For a conventionally known printing apparatus, there is proposed a mechanism targeting power saving of not only a print engine but also a controller (to be referred to as a video controller or process means) for an image process or the like in order to further save power.

In this proposal, the waste of CPU power used for monitoring is considered as a problem because an external communication request is conventionally monitored by a CPU which forms a controller. To solve this problem, this proposal discloses a mechanism of monitoring whether data have been received from external host computers, i.e., monitoring external accesses from a 1284 interface, USB interface, and 100BT interface by an always ON communication I/F (communication controller) including a reception buffer and the like while powering off the controller including the CPU. This mechanism stops power to the controlling including the CPU, and allows receiving an external print request.

There is also proposed a printing apparatus which gives attention to the fact that many irrelevant data exist in a network. In this printing apparatus, the communication I/F determines whether data is related to the printing apparatus, by determining a packet addressed to the printing apparatus on the basis of an IP address contained in ARP data. When the IP address of the printing apparatus is confirmed, the controller is powered on to achieve efficient recovery by power-on.

The proposed printing apparatus performs network access on the assumption of an APR packet containing an IP address to the printing apparatus itself. The printing apparatus cannot cope with a case in which a host computer searches for a plurality of devices, degrading the function of the printing apparatus system.

Moreover, the proposed printing apparatus must energize the whole communication I/F including a detector which detects connections to a local interface (e.g., USB) and LAN (Ethernet), a reception buffer which operates the CPU of the main body controller when communication via the USB or Ethernet is detected, and various controllers. From this viewpoint, there is a room for improvement in further power saving.

As a measure, power supply to the communication I/F may be simply stopped. However, when an external host computer requests any operation of the printing apparatus, the printing apparatus does not respond to it, and the function of the printing apparatus is not fulfilled. Needless to say, when the printing apparatus does not respond to external access, the main power supply may be manually turned on with low user convenience.

SUMMARY OF THE INVENTION

The present invention has been made to overcome the conventional drawbacks, and has as its object to provide a mechanism in a printing apparatus which can fulfill the network function of the printing apparatus in a printing system in which a plurality of external apparatuses are connected while promoting power saving of a controller (process means) which performs a print data image process and the like in a printing control apparatus.

It is another object of the present invention to provide the mechanism of a printing apparatus which can save power of a communication I/F including a communication controller and fulfill the function of the printing apparatus without any cumbersome user operation as described above.

More specifically, according to the present invention, a printing control apparatus comprises a processor for performing an image process for print data externally received via a network, a first interface including a monitoring unit which monitors reception of data, from external, with one of a plurality of types of patterns including a pattern containing communication information addressed to an unspecified apparatus and an identifier used for power control, and a communication controller which transfers externally transmitted data to the processor, and a power controller for powering on the processor when data with the pattern is received via the first interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a table showing an example of unique pattern data according to the second embodiment of the present invention;

DETAILED DESCRIPTION OF THE PREFERRED EMBODIMENTS

Preferred embodiments of the present invention will now be described in detail in accordance with the accompanying drawings. Note that building components to be described in the following embodiments are merely an example, and the present invention is not limited to them.

First Embodiment

Figure 1:
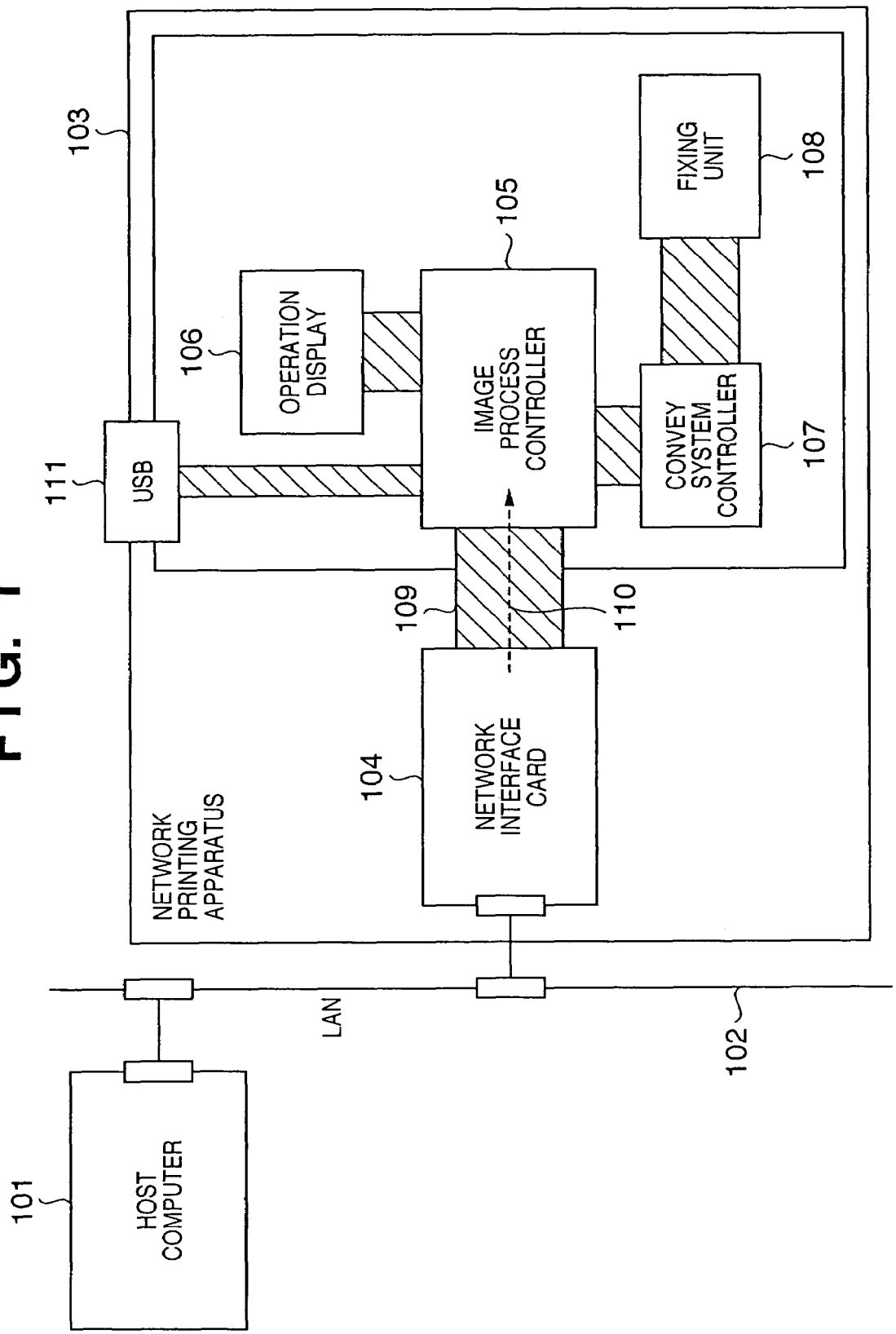
FIG. 1 is a block diagram showing the schematic configuration of a printing system according to the first embodiment of the present invention.

A preferred embodiment according to the present invention will be described in detail below with reference to the accompanying drawings. FIG. 1 is a block diagram showing the configuration of a printing system according to the first embodiment.

The printing system according to the first embodiment comprises a host computer 101, a network printing apparatus main body 103, a network interface card 104 which is incorporated or mounted in the network printing apparatus main body 103, an image process controller 105 serving as a function block inside the printing apparatus, an operation display 106, an engine controller 107 which controls image formation based on image data sent from the image process controller 105 via a video interface or a process of a print paper convey system, a fixing unit 108 serving as an engine, a physical interface 109 which connects the network interface card 104 and image process controller 105, a USB interface 111, and a network 102 such as a LAN.

FIG. 1 illustrates only two interfaces, but the present invention is not limited to this. In some cases, three or more interface means may be adopted. For example, a parallel interface may be further added to the form of FIG. 1.

Although not shown, the fixing unit 108 includes various known laser units, polygon mirrors, photosensitive drums, developing units, primary charging rollers, and registration rollers. The unit 107 is called an engine controller, and the fixing unit 108 is called an engine. The engine controller 107 and fixing unit 108 may be called an engine or printer engine at once as a part associated with printout on an actual print medium.

The image process controller 105 is generally called a video controller, and has various control process functions. For example, the image process controller 105 generates raster data of a format processible by the engine from a page description language transmitted from the host computer 101. The image process controller 105 responds to various inquiries from the host computer 101. The image process controller 105 actively notifies the host computer 101 of error information such as jam detected by various sensors of the engine.

The host computer 101 sends printing-related information such as print data and a print command to the network printing apparatus main body 103, and causes the network printing apparatus main body 103 to print.

A broken arrow 110 extending from the network interface card 104 to each function block via the physical interface 109 indicates an interrupt signal used when the network interface card 104 switches the image process controller 105 from a power saving mode to a normal mode.

When the USB interface 111 is connected, the image process controller 105 is always ON and receives a status and data from the USB. When the network interface card 104 is connected and no USB interface 111 is connected, the image process controller 105 shifts to power saving operation to cache various pieces of information including the status of the printing apparatus in the network interface card 104.

Figure 2:
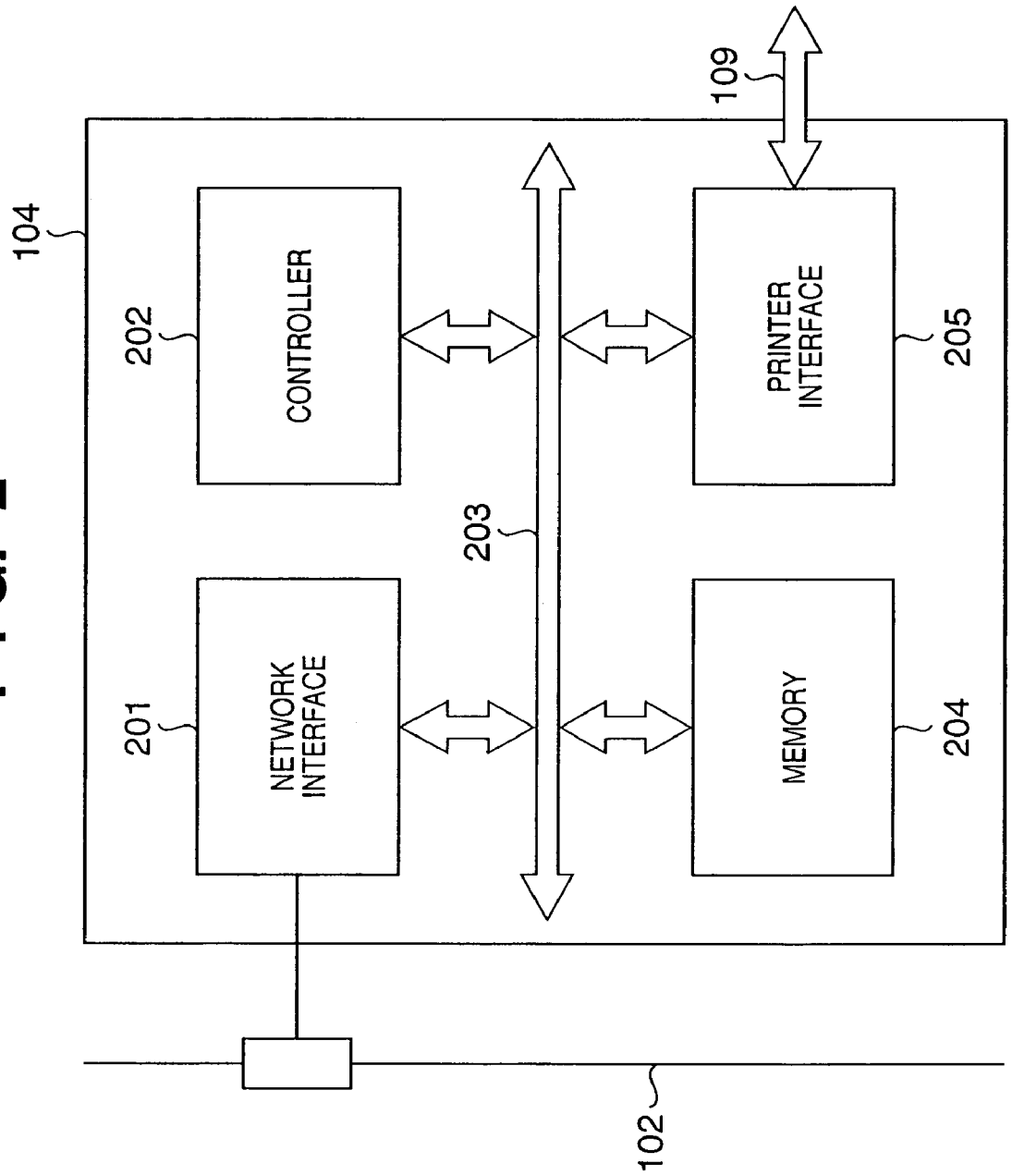
FIG. 2 is a block diagram showing the schematic configuration of a network interface card according to the first embodiment.

FIG. 2 shows the configuration of the network interface card 104. The network interface card 104 is comprised of a network interface 201 which is physically connected to the network 102, a controller 202 which performs control inside the network interface card 104 and controls the power saving mode/normal mode of each function block in the network printing apparatus 103, an internal network bus 203, a memory 204 which temporarily stores a program for controlling the network interface card 104 and transmission/reception data and stores various pieces of information including the status of the network interface card 104 and the power saving mode/normal mode state of each function block, a printing apparatus interface 205 which exchanges data with the image process controller 105, and the physical interface 109 which connects the network interface card 104 and image process controller 105.

The controller 202 is formed from a central processing unit (CPU). The controller 202 controls the operation of the overall apparatus such as read/write of information with respect to each building component. The memory 204 is a rewritable nonvolatile memory. The memory 204 may also be formed from a rewritable volatile memory and non-rewritable nonvolatile memory.

The memory 204 will be explained in details. The memory 204 holds an engine status sent before the image process controller 105 shifts to a state in which power is much lower than that in a state in which the image process controller 105 finishes calculation such as conversion of a page description language and waits. The engine status is the number of remaining paper sheets, the remaining toner amount, or the like. When the engine and image process controller are set in the power saving state and an external apparatus sends a printing apparatus status request, the external apparatus is notified of status information held in the memory 204 via the network interface 201. Information other than status information is also held in the memory 204, and the held information is also sent to the external apparatus.

Figure 3:
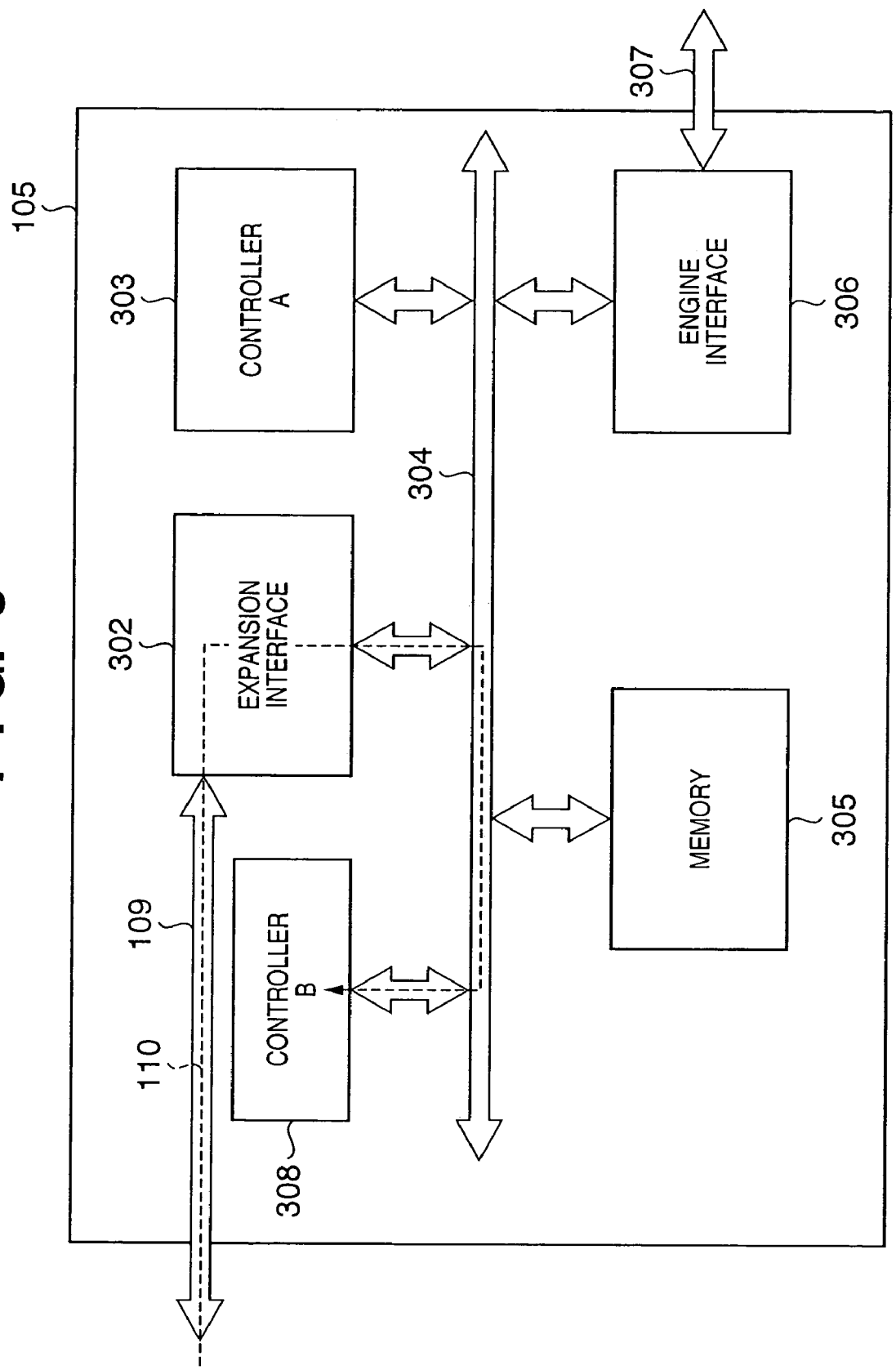
FIG. 3 is a block diagram showing the schematic configuration of an image process controller according to the first embodiment of the present invention.

FIG. 3 shows the configuration of the image process controller 105. The image process controller 105 is built by an expansion interface 302 which is connected to the physical interface 109, a controller B 308 which exclusively processes the interrupt signal 110 for switching from the power saving mode to the normal mode, a controller A 303 which controls the internal blocks of the image process controller, a bus 304 inside the image process controller, a memory 305 which temporarily stores a program for controlling the image process controller 105 and transmission/reception data and stores status information of the image process controller 105, an engine interface 306 which exchanges data signals with the engine controller 107, and a bus 307 for the engine interface.

The controller A 303 is formed from a central processing unit (CPU). The controller A 303 controls the operation of the overall apparatus such as read/write of information with respect to each building component. The controller B is also a CPU, but does not require performance as high as the controller A 303 and suffices to have process performance of about 8 bits because the controller B only processes an interrupt signal. The memory 305 is a rewritable nonvolatile memory. The memory 305 may also be formed from a rewritable volatile memory and non-rewritable nonvolatile memory.

The controller A 303 also manages connection to a USB interface serving as the second interface means shown in FIG. 1. The controller A 303 has a function of determining whether the second interface means is connected. When the controller A 303 determines that the second interface means is connected, the image process controller 105 does not shift to the power saving mode. Since the image process controller 105 shifts to the power saving state in accordance with whether the second interface means is connected, power of up to the image process controller 105 can be saved while any error is avoided in the printing environment. In this case, the power saving mode means a state in which power is much lower than that in a state in which the image process controller 105 finishes calculation such as conversion of a page description language and waits.

Figure 4:
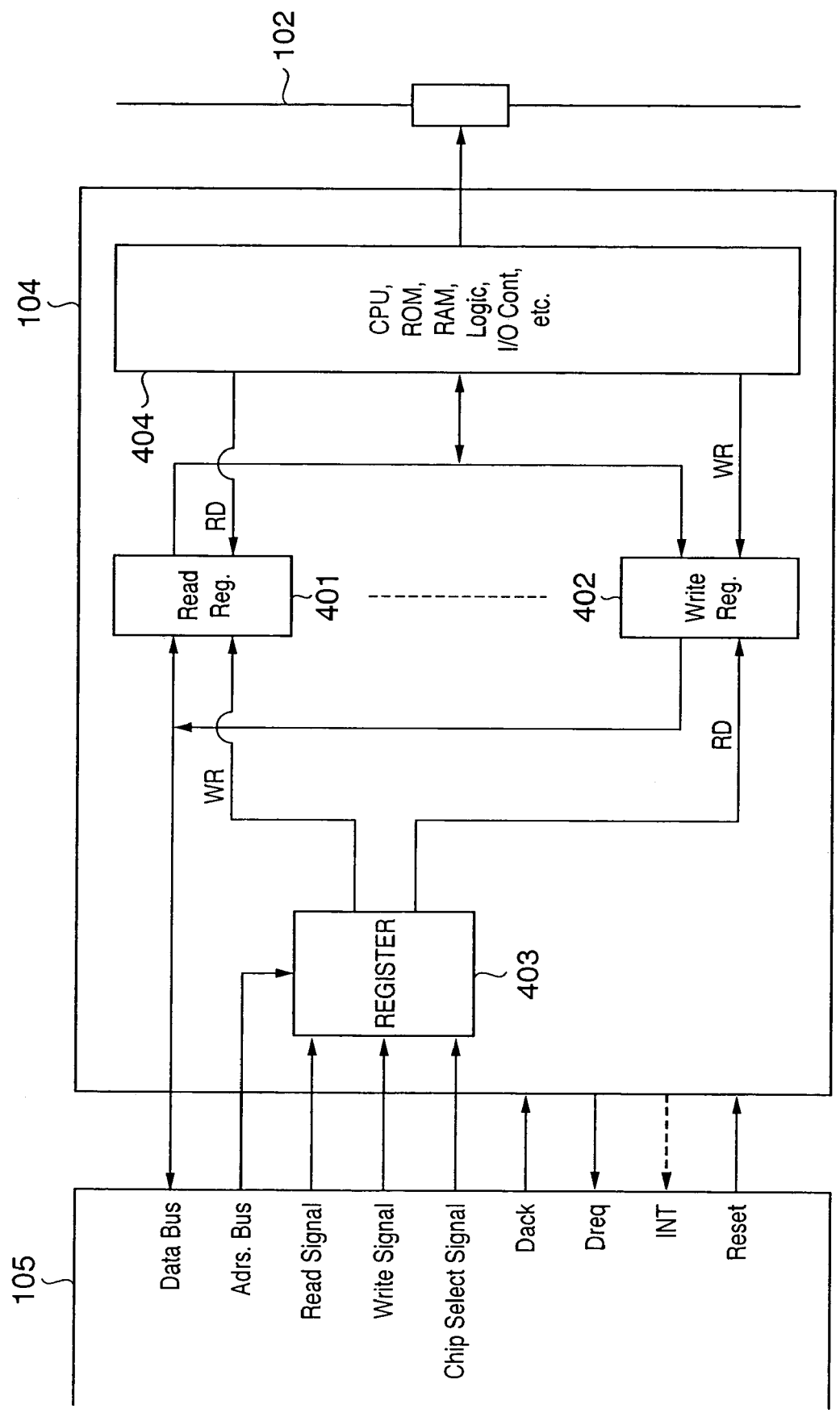
FIG. 4 is a block diagram for explaining a process inside the network interface card according to the first embodiment of the present invention.

FIG. 4 is a block diagram for explaining a function of writing a flag representing switching to the power saving mode in a predetermined register in the network interface card 104 and obtaining the state of an interrupt signal for switching the image process controller 105 from the power saving mode to the normal mode immediately before the image process controller 105 switches to the power saving mode.

The image process controller 105 sets "1" at a predetermined bit of a read register 401 within the network interface card 104 to notify the network interface card 104 that the image process controller 105 switches to the power saving mode. In the network interface card 104, a CPU in a block 404 periodically polls the predetermined bit, and can always monitor the state of the image process controller 105.

When the network interface card 104 must recover the image process controller 105 (switch the image process controller 105 from the power saving mode to the normal mode) upon reception of data from the host computer 101 via the network 102, an interrupt signal (INT signal) in FIG. 4 is made active. In response to the interrupt signal, the controller B 308 in the image process controller 105 switches the whole image process controller 105 to the normal mode.

Figure 5:
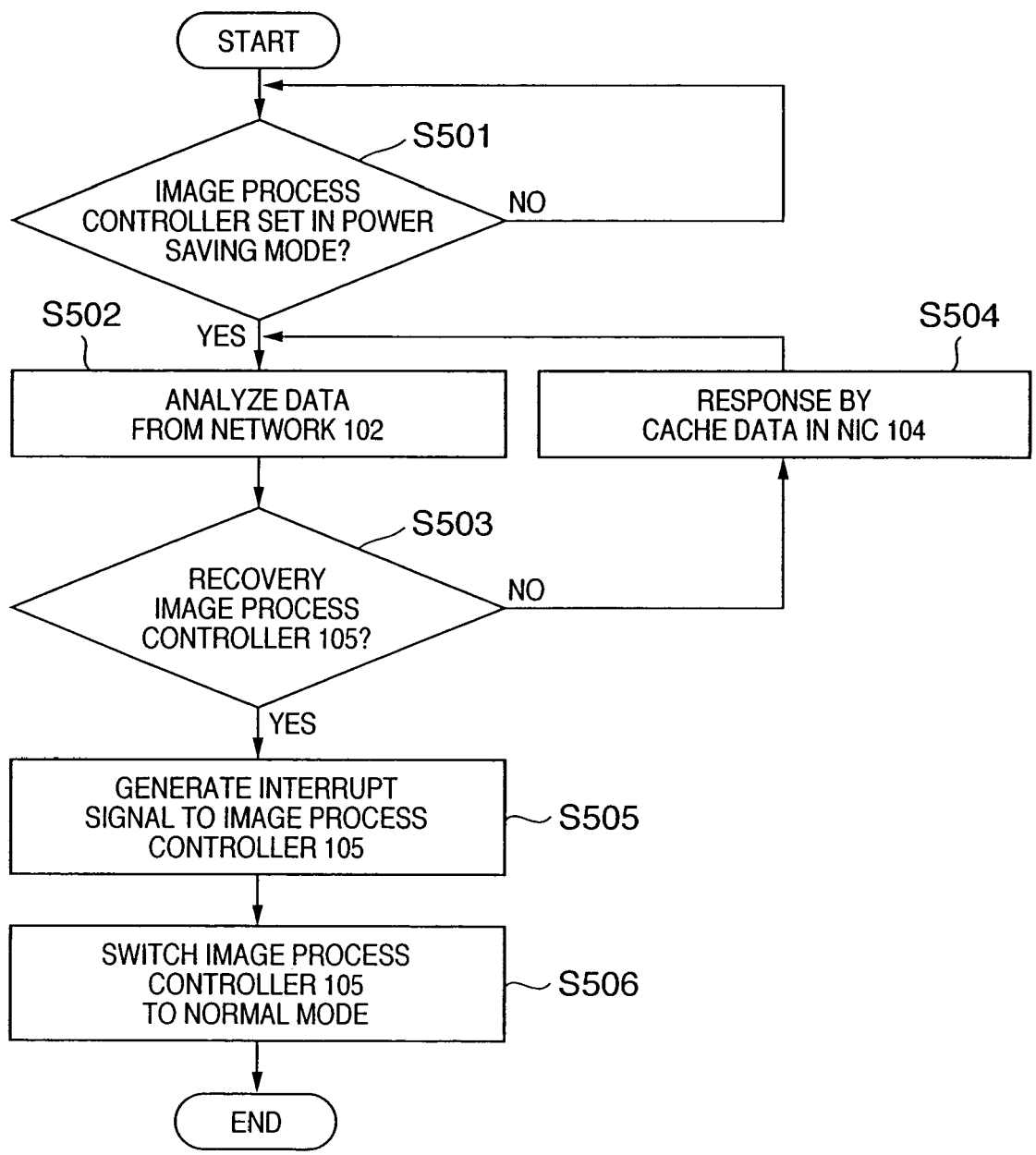
FIG. 5 is a flowchart showing a process of switching the operation mode of the image process controller according to the first embodiment of the present invention.

FIG. 5 is a flowchart showing an operation sequence when the image process controller 105 switches from the power saving mode to the normal mode or from the normal mode to the power saving mode in accordance with data from the host computer 101.

In step S501, the network interface card 104 determines the current operation mode of the image process controller 105. The current operation mode is determined by periodically polling a predetermined bit of the register in the network interface card 104. For example, the network interface card 104 determines that the current operation mode of the image process controller 105 is the power saving mode when the predetermined bit of the register is set, and that the current operation mode is the normal mode when no predetermined bit is set.

As described above, the image process controller has a function of controlling the power supply state of the process means in accordance with the connection status of the second interface means such as a USB interface. When the image process controller 105 recognizes that the second interface is connected, the image process controller 105 does not shift its power state to the power saving mode. As a result, the network interface card determines NO in step S501.

The power supply state of the process means is so controlled as to reduce power consumption when no external apparatus is connected via the USB interface means and no print data is received from an external apparatus via the first interface means within a predetermined time, or when the output means does not provide any output based on print data.

If the image process controller 105 is determined in step S501 to be set in the power saving mode, the network interface card 104 analyzes data from the network 102 in step S502. For example, the network interface card 104 analyzes whether data has been transmitted from the host computer 101.

In step S503, whether the image process controller 105 must be recovered is determined as a result of data analysis in step S502. More specifically, whether to utilize response information in the internal cache of the network interface card 104 as a response to data, or whether requested response information is information which cannot be obtained unless the image process controller 105 is recovered to the normal mode is determined as a result of data analysis by the network interface card 104.

Examples of cacheable information and non-cacheable information (information which cannot be obtained unless the image process controller 105 is recovered to the normal mode) are as follows.

Cacheable information (MIB information polled by the network utility)
    the name of a device given by the user (e.g., laboratory printer)
    the product name of the device
    the type of device (e.g., LBP or MFP)
    status code representing the device state (when the image process controller 105 is set in the power saving mode, the network interface card 104 sends back a status code corresponding to "during the power saving mode" instead of the image process controller 105)
    error currently generated in the device (no error can be detected during the power saving mode, and thus a previously inquired value is sent back)

Non-cacheable information (case in which the image process controller 105 must be recovered to the normal mode)
    data acquisition request other than the cache (e.g., real-time status acquisition request such as the remaining number of paper sheets for the engine)
    supplied print data (job)

If it is determined in step S503 that the response information is cacheable information and the image process controller 105 need not be restored, information cached in the network interface card 104 (NIC 104 in FIG. 5) is sent back to the host computer 101 in step S504. The process then returns to step S502 again to restart data analysis from the network 102.

If it is determined in step S503 that the response information is non-cacheable information and the image process controller 105 must be recovered, the network interface card 104 generates an interrupt signal (INT signal) in step S505 in order to instruct the controller B 308 in the image process controller 105 to switch the operation mode.

In step S506, the controller B 308 receives the interrupt signal (INT signal) to switch the whole image process controller 105 from the power saving mode to the normal mode.

In this way, the network interface card 104 analyzes data received from the network 102, and determines whether to recover the image process controller 105 from the power saving mode. As far as response information requested by the network 102 is cacheable information, the network interface card 104 can send back the information to continue the power saving mode of the image process controller 105. For example, alive data necessary for a predetermined network communication protocol can be transmitted, and the time during which the image process controller 105 is set in the power saving mode can be prolonged.

Note that the output unit of the printing apparatus main body may be a laser printing apparatus, inkjet printing apparatus, or thermal transfer printing apparatus. This can also be applied to color printing. The printing apparatus is not limited to a binary-output printing apparatus, and may be a multi-level-output printing apparatus.

Second Embodiment

In the first embodiment, the controller A 303 manages connection to a USB interface serving as the second interface means shown in FIG. 1, and determines whether the second interface means is connected. When no external apparatus is connected via the second interface means, i.e., no second interface means is utilized, power consumption of the controller A 303 (process means) including the second interface detection function is suppressed, or power to the controller A 303 is stopped.

The second embodiment will describe a printing apparatus which further saves power consumption of a network or location communication unit without impairing the userbility.

Figure 6:
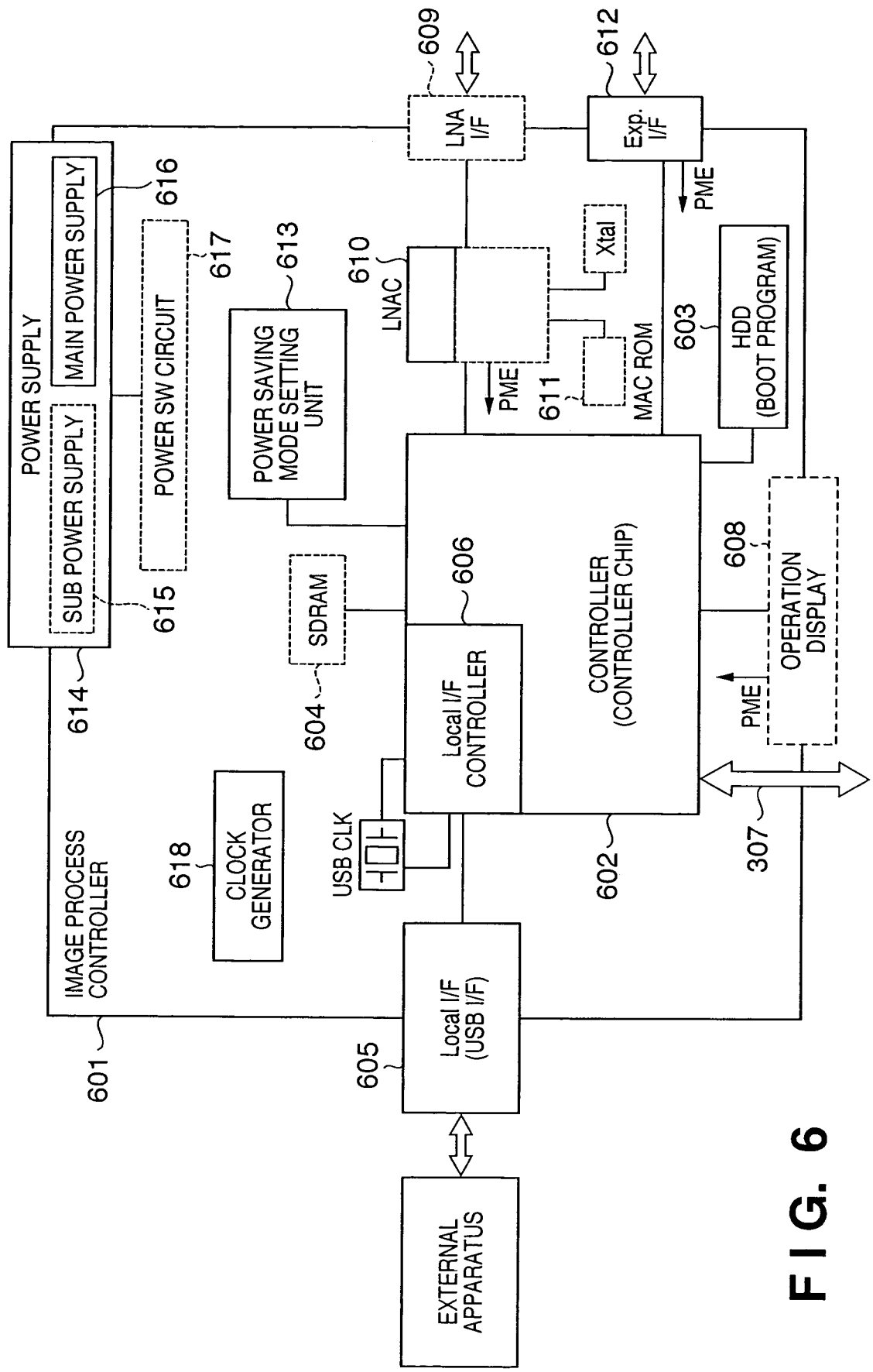
FIG. 6 is a block diagram showing the schematic configuration of a printing system according to the second embodiment of the present invention.

FIG. 6 is a block diagram showing the configuration of a printing system according to the second embodiment.

Reference numeral 601 denotes an image process controller. The image process controller 601 corresponds to the image process controller 105 in the first embodiment.

The image process controller 601 includes a 1-chip controller (controller chip) 602 which controls the overall controller. The controller 602 is formed from an ASCI including a ROM I/F which stores various programs (not shown), a RAM (including a DRAM) I/F, a PCI bus I/F, a video I/F function, conversion hardware for a printing description language transferred from an external apparatus, and compression and decompression functions for various data.

The controller 602 also comprises a function of performing an image process for print data received from, an external apparatus via a network and a LAN controller 610, and a function of receiving and processing data transferred via the LAN controller 610.

Reference numeral 603 denotes a hard disk serving as a nonvolatile storage means for keeping holding data even when the main power supply is OFF.

The hard disk 603 stores initial programs for respective units of the image process controller 601, initial setting values (parameters) associated with an image process, communication, display, and the like, and programs which define various operations such as an image process, communication, and display. In the second embodiment, data which are stored in the hard disk and associated with initialization may also be referred to as initialization data or setting data.

When the main power switch of the printing apparatus main body is turned on, execution of a boot program stored in the hard disk 603 starts. Initialization programs, initial setting values (parameters), and main programs are loaded from the hard disk 603 to the image process controller 601 including the controller 602 to execute an initialization process.

An SDRAM 604 temporarily stores data obtained by converting print data by the controller 602. Various initial setting values and various programs which are loaded from the hard disk 603 in the initialization process are temporarily saved in the SDRAM 604 in accordance with shift to deep sleep (to be described later). The saved initial setting values and programs are utilized again by respective units in recovery from deep sleep. This enables high-speed recovery upon powering on these units.

The memory 604 is not limited to the SDRAM, and a DDR-SDRAM, SRAM, or the like can also be provided. In general, a volatile storage means is higher in data read/write speed than a nonvolatile storage means such as a hard disk, EEPROM, or flash memory. The volatile storage means is desirably assigned to the memory 604. Especially for a program of a large data size, the program must be stored in the hard disk owing to the data size limitation of the ROM. In this case, the volatile storage means can increase the speed.

A USB interface 605 is connected via a bus to a local I/F controller 606 included in the controller 602, and the local I/F controller 606 is incorporated in the controller 602. The local I/F controller functions as local communication control of performing a reception process for data sent from an external apparatus via a local interface.

Power supplied to the local I/F controller 606 depends on the controller 602. When the controller 602 is powered off, power to the local I/F controller 606 also stops. The local I/F controller 606 also comprises a function of recognizing whether an external apparatus is communicably connected via the local I/F 605. The local I/F controller 606 may be arranged separately from the controller 602.

An operation display 608 of the printer apparatus receives power from a sub power supply. The operation display 608 can be utilized when the user confirms the status of the printing apparatus including the image process controller 601 or changes the settings of various image processes.

An activation signal (PME in FIG. 6) which recovers the image process controller 601 from the deep sleep state (to be described in detail later) is issued in accordance with an operation to the operation display 608. PME is an abbreviation of Power Management Event, and is used to designate power-on operation of the system. PME can be received by a system which comprises a PCI 2.2 bus. However, the present invention is not limited to PME, and can be applied to a unique instruction signal or another instruction signal as far as the signal can designate power-on operation.

A LAN (Local Area Network) I/F 609 is an interface means for various data communication operations with a plurality of external apparatuses (to be also referred to as host computers or information processing apparatuses). For example, a 10/100BASE-T connector can be employed.

The LAN controller 610 controls communication with an external apparatus via the LAN I/F 609. The LAN controller 610 is comprised of a dotted part which receives power from a sub power supply, and an undotted part which receives power from a main power supply.

The dotted part of the LAN controller 610 functions as a monitoring unit which monitors, in response to an external inquiry via the LAN I/F 609, whether data with any one of a plurality of patterns has been received. When one of patterns is recognized by monitoring of the monitoring unit, an activation signal is so issued as to recover the controller 602 from deep sleep.

A plurality of patterns are registered in a MAC ROM 611, and loaded by the LAN controller 610 in the initialization process. For this purpose, the MAC ROM 611 may receive power from a main power supply.

Examples of the patterns are (1) the pattern of an ARP (Address Resolution Protocol) packet in which the target IP address is the IP address of a target apparatus, and (2) a multicast packet or broadcast packet having a pattern containing communication information addressed to unspecified apparatuses and a unique identifier used for power control. That is, address of unspecified apparatuses indicates two or more apparatuses by multicast address or a broadcast address.

Communication information means information for data communication, such as the destination Ether address of an Ether frame, the destination IP address of an IP frame, a source port number, or a destination port number.

The unique identifier used for power control means a pattern such as a specific operation code or specific character string which can be interpreted as a trigger pattern for recovery of the printing apparatus from deep sleep.

Not only the printing apparatus but also the host computer comprise a generator (application, communication module, printer driver, or the like) which generates a unique pattern.

FIG. 7 shows an example of a pattern monitored by the LAN controller 610. In FIG. 7, starred parameter items 701 to 706 are SLP (Service Location Protocol) service request packets and addressed to a plurality of apparatuses. Particularly, it is possible to be identified as SLP packet by the destination port number of item 706. A certain pattern for an identification as SLP may be included in the frame pattern of 707. Reference numeral 707 denotes a unique frame pattern serving as an identifier used for power control in the printing apparatus. The unique frame pattern can be arbitrarily set by the printing apparatus provider or the user, and can be utilized to recover apparatuses assumed by the printing apparatus provider or the user from deep sleep at once. This allows searching a network for only a necessary device or searching for a network in set-up of a printer driver. Though the frame pattern of 707 shows only one item, it may be constituted by including a plurality of items.

An external apparatus notifies a plurality of printing apparatuses on a network by multicasting of an inquiry by data as shown in FIG. 7. In response to this, a plurality of printing apparatuses which can interpret the unique frame pattern 707 can be activated at once by a few operations.

Note that a pattern containing communication information addressed to unspecified apparatuses and an identifier used for power control is not limited to pattern examples of the SLP packet in FIG. 7. The pattern may contain a uniquely created identifier (unique frame pattern). Also, the pattern may contain an identifier used for power control in addition to an item for identifying an SLP packet (communication information addressed to unspecified apparatuses). For example, a fictitious value may be set in "source port number" in FIG. 7, and the printing apparatus may be recovered from the deep sleep state on the basis of interpretation of the fictitious value.

The undotted part of LAN controller 610 functions as a communication controller which transfers data transmitted from one of a plurality of external apparatuses to the controller 602 (process means) and causes the controller 602 to process the data. By issuing a PME activation signal, the undotted part receives power from the main power supply, and can operate.

In this manner, various print instructions from an external apparatus can be coped with by monitoring a plurality of patterns by the monitoring unit of the LAN controller 610. For example, when an external apparatus which incorporates Windows® is to issue a print job to the printing apparatus by using a printer driver or the like, an ARP packet can be issued to recover the printing apparatus from deep sleep in advance. When an external apparatus searches for a plurality of printing apparatuses on a network, a broadcast or multicast packet containing a unique data pattern can be issued to recover the printing apparatuses from deep sleep and search for them. As a result, power saving of the controller 602 and communication controller (part of the LAN controller 610) is promoted, and the convenience of the printing apparatus for the user can be maintained.

A plurality of specific data patterns to be monitored by the monitoring unit of the LAN controller 610 are registered in the MAC ROM 611. The MAC ROM 611 can store a plurality of specific data patterns as monitoring targets as far as the data amount exceeds the capacity.

An expansion interface 612 is used to expand various functions, and various optional devices are mounted via the expansion interface 612. For example, the expansion interface 612 can mount the network interface card 104 described in the first embodiment.

A power saving mode setting unit 613 holds a setting representing whether to shift to the deep sleep mode. This setting can set whether to shift to the deep sleep mode when an external apparatus is connected via the local I/F 605.

A power supply 614 includes a sub power supply 615 and main power supply 616. The sub power supply 615 serves as a power supply source to each dotted block in FIG. 6 in the deep sleep state (to be described later). When the image process controller 601 recovers from the deep sleep state, the main power supply 616 supplies power to each undotted block in FIG. 6.

Reference numeral 617 denotes a power switch circuit having a function of controlling power supply from the sub power supply 615 or main power supply 616 of the power supply 614 to each block. For example, a FET (Field Effect Transistor) IC chip is used to supply power upon reception of a deep sleep activation signal. With this structure, the power switch circuit 617 can operate with low power.

When a power activation instruction signal (PME) issued from the operation display 608, expansion I/F 612, LANC 610, or the like in FIG. 6 is supplied to the power switch circuit 617, and a power activation signal is supplied from any one of blocks to the power switch circuit, the power switch circuit 617 performs a switching process so as to supply power from the main power supply 616 to each undotted block in FIG. 6.

Deep sleep in the second embodiment will be explained. When the image process controller 601 having the configuration of FIG. 6 does not detect any interrupt signal for a predetermined time upon activation of the timer, the image process controller 601 supplies power from the sub power supply to minimum parts necessary for recovery from a state in which reception and processing of print data and a status request from an external apparatus cannot be coped with, such as the SDRAM 604, operation display 608, expansion interface 612, LAN controller 610, network interface 609, and power switch circuit 617 among blocks in the image process controller 601. The image process controller 601 stops power to the remaining functional blocks.

The second embodiment defines this state as the deep sleep state. In the deep sleep state, power of a part which manages the local I/F controller 606 is saved.

Figure 8:
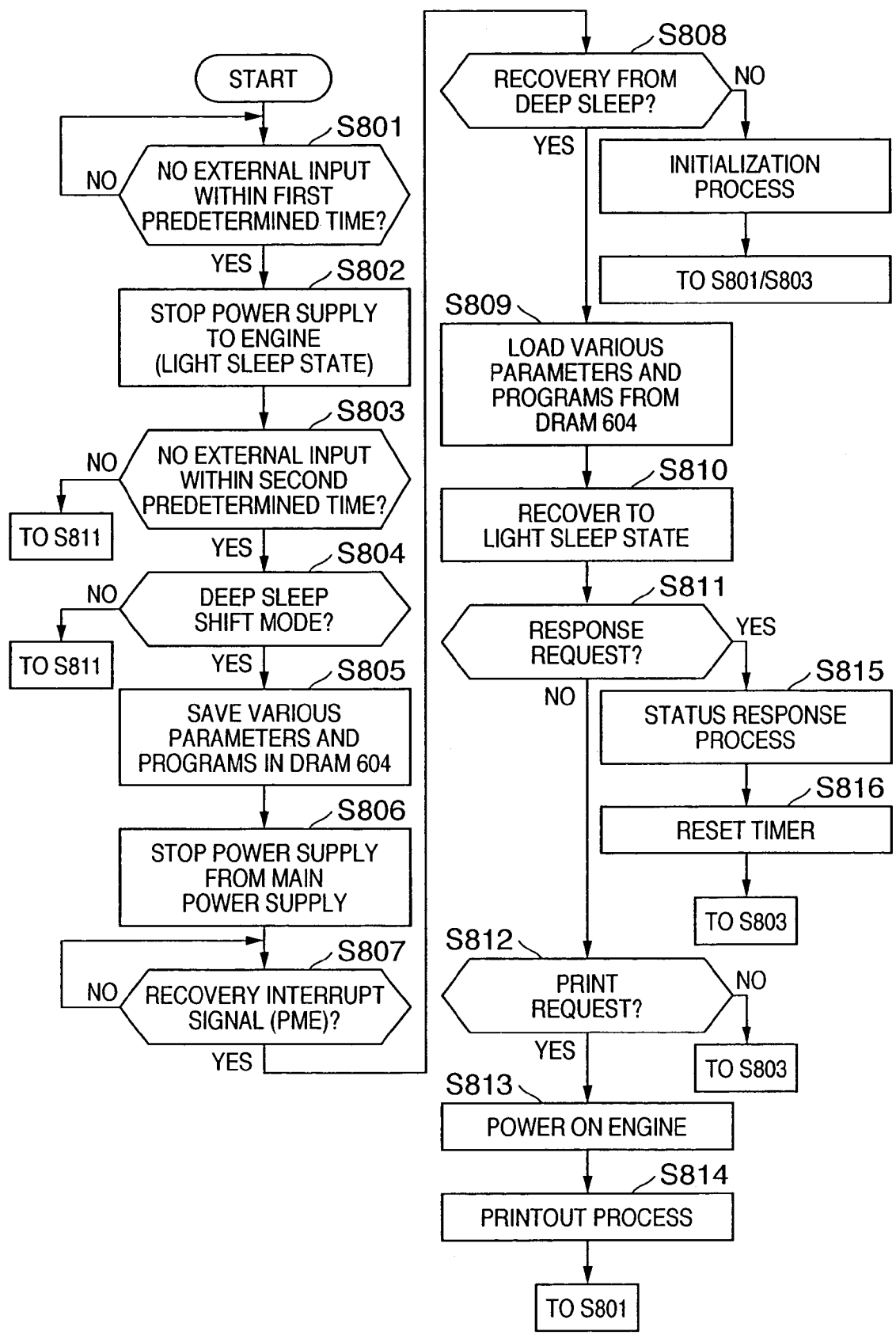
FIG. 8 is a flowchart showing a recovery process from a deep sleep mode according to the second embodiment of the present invention.

FIG. 8 is a flowchart showing a process of activating the controller 602 when a power supply event occurs.

In step S801, whether an external input is received within the first predetermined time is determined. An example of the external input is print data (print request). If NO in step S801, the determination process in step S801 is repeated until the first predetermined time elapses.

In practice, the determination process in step S801 corresponds to a process of monitoring generation of an event. In other words, an event issued upon the lapse of the first predetermined time can be monitored.

YES is determined in step S801 when a command to forcibly shift to light sleep is issued from the operation display 608 or expansion interface 612. Various conditions can be applied.

If YES in step S801, power supply to the printer engine is suppressed in step S802. As power saving, power supply to the printer engine may be stopped, or supply power may be reduced to a degree enough to maintain preliminary heat of the printer engine. A power state achieved in step S802 will be called light sleep.

In step S803, whether an external input is received within the second predetermined time is determined. Examples of the external input are requests for various states of the printing apparatus, print data, and an instruction input via the operation display.

YES is determined in step S803 when a command to forcibly shift to deep sleep is issued from the operation display 608 or expansion interface 612. Various conditions can be applied.

If YES in step S803, whether shift to the deep sleep mode has been set is determined in step S804. This is determined when the block of the controller 602 or image process controller 601 refers to the above-mentioned flag stored in the power saving mode setting unit 613.

If NO in steps S803 and S804, the process advances to step S811 to monitor external access by the LAN controller 610. Particularly the process in step S804 can control the power supply state of the controller 602 in accordance with the connection status of an external apparatus to the local I/F 605. This can be implemented when the user does not want shift to deep sleep because of any reason.

If YES in step S804, various parameters and various main programs which have been loaded to the image process controller 601 (or controller 602) in the initialization process are saved in the high-speed returnable SDRAM 604. Setting data to the local communication control means is also saved in the temporary storage means by the save means in suppressing power supply so as to stop the local I/F controller 606 (local communication control means).

After the save process in the SDRAM 604 ends, power supply from the main power supply 616 stops in step S806. More specifically, a switching signal is supplied to the power switch circuit 617 so as to stop power supply from the main power supply. The power switch circuit 617 operates to stop power supply from the main power supply. Accordingly, power supply to each undotted part in FIG. 6 stops, and the image process controller 601 shifts to the deep sleep state in which stand-by power is lower than 1 W. Power is also saved to stop not only the controller 602 but also the undotted part (communication controller which transfers external data to the controller 602) of the LAN controller 610. Further power saving can be realized in the communication unit.

In step S807, an event for designating recovery from deep sleep is monitored. More specifically, when PME in FIG. 6 is supplied to the power switch circuit 617, YES is determined in step S807. The event monitoring process in step S807 may be implemented using hardware such as the power switch circuit 617 or software.

If YES in step S807, whether this recovery is recovery from deep sleep is determined in step S808. This is determined by holding the shift log to the deep sleep state in steps S805 and S806 as a flag and referring to the flag by the power switch circuit 617. For example, when the flag is set in the power switch circuit 617, the flag can be determined with a simpler design. When no flag is set, the main power supply is turned on from the OFF state. In this case, an initialization process for the printing apparatus main body is executed on the basis of setting data loaded from the nonvolatile storage means (hard disk 603), and then the process shifts to step S801 or S803.

If YES in step S808, various parameters and main programs which have been saved in the SDRAM 604 in step S808 are loaded by the controller 602.

Parameters loaded in step S809 include configuration information which is written in the register of the local I/F controller 606. For example, parameters include USB version information. This can implement high-speed recovery without loading again initial setting data from the HDD or the like in recovery from deep sleep while saving power of the local I/F (USB) controller 606.

In step S810 after the process of step S809, the power state is recovered to the light sleep state. In the light sleep state, the printing apparatus can communicate with an external apparatus via the LAN, USB, or the like without operating the hard disk 603 and printer engine. At this time, power is also supplied to the undotted part (communication controller which transfers external data to the controller 602) of the LAN controller 610.

Recovery to light sleep in step S810 corresponds to transition to a state in which reception of print data and an external inquiry can be coped with. Processes in step S811 and subsequent steps are executed in accordance with various commands from an external apparatus after recovery to light sleep. However, the present invention is not limited to this when the above-described unique frame pattern in FIG. 7 contains a status request and search response request instruction.

In step S811, whether an external apparatus has issued a request for the state of the printing apparatus is determined. If YES in step S811, a response process is performed in step S815, the timer is reset in step S816, and the process returns to step S803.

Several seconds may be taken for recovery from deep sleep to light sleep in accordance with the read speed and read data amount of the SDRAM. In this case, the printing apparatus cannot quickly respond to an external request. However, by causing the external apparatus to retry the request, the printing apparatus can send back a status response request to the external apparatus.

If NO in step S811, whether a print request has been received is determined in step S812. If NO in step S812, the process returns to step S803.

If YES in step S812, the power supply is controlled in step S813 so as to power on the printer engine, and various printout processes are executed in step S814. After the printout processes end in step S814, the process returns to step S801 again.

A monitoring process up to generation of a recovery signal from deep sleep that includes a monitoring process by the monitoring unit of the LAN controller 610 that monitors reception of data with any one of a plurality of types of patterns in response to an external inquiry will be explained with reference to FIG. 9.

Figure 9:
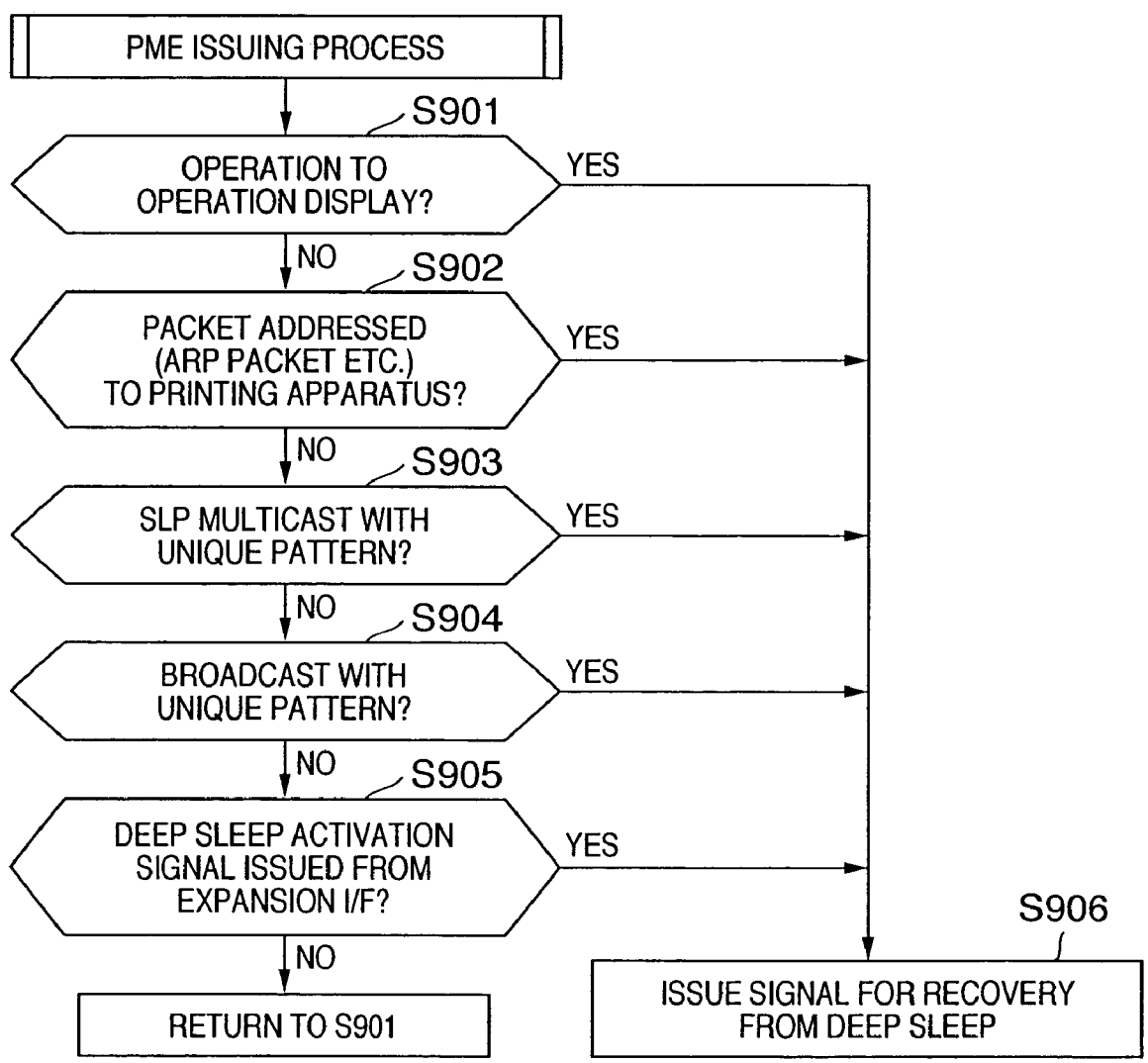
FIG. 9 is a flowchart showing a detection process for a deep sleep recovery factor according to the second embodiment of the present invention.

If step S906 in FIG. 9 is executed, YES is determined in step S807 of FIG. 8. The flowchart of FIG. 9 may be executed in synchronism with step S807 of FIG. 8 or parallel-executed as a routine independent of the flowchart of FIG. 8. Processes in steps of FIG. 9 are executed when the image process controller 601 is set in the deep sleep state. Step S901 is executed in accordance with an operation to the operation display 608 in FIG. 6. Processes in steps S902 to S905 correspond to processes performed by the LAN controller 610 in FIG. 6. When a signal is issued in the process of S906, YES is determined in step S807 of FIG. 8.

In step S901, whether the operation display has been operated is determined. An operation to the operation display may be press of a button attached to the operation display, or touch to a liquid crystal screen when the operation display is a liquid crystal display panel.

If YES in the determination process of S901, the local I/F controller 606 is powered on. An external apparatus connected via the local I/F 605 is located near the printing apparatus. Energy can be further saved without impairing the userbility and keeping the local I/F controller 606 ON for local interface connection.

In step S902, whether a packet addressed to the printing apparatus has been received is determined. Whether the packet is addressed to the printing apparatus may be represented by an IP address, MAC address, device serial number, or device name contained in the packet. An example of the packet addressed to the printing apparatus is an ARP packet.

In step S903, whether an SLP multicast pattern packet containing a unique pattern has been received is determined. The unique pattern suffices to be described at the expanded portion of the SLP multicast pattern. Data which can embed a unique pattern can be properly employed as target data in step S903. A destination address of SLP packet in FIG. 7 may be used as broadcast address.

In step S904, whether broadcast data containing a unique pattern has been received is determined. Also in this case, broadcast data which embeds a unique pattern can be properly adopted as target data in step S904.

In step S905, whether a PME signal has been issued via the expansion I/F 612 is determined. For example, when a network interface card 104 is connected via the expansion I/F 612, a PME signal can be issued from the expansion I/F 612 by providing the network interface card 104 with the same functions as the LAN interface 609 and LAN controller 610 in FIG. 6. An INT signal from the network interface card 104 in the first embodiment may also be monitored.

According to the flowchart of FIG. 9, reception of data with any one of a plurality of types of patterns including a pattern containing communication information addressed to unspecified apparatuses (multicast address or broadcast address) and an identifier used for power control can be monitored in response to an external inquiry. In addition, the controller 602 can be powered on upon reception of data with any pattern via the LAN I/F 609 and LAN controller 610 (first interface means).

Supply of print data via the local I/F controller 606 will be explained.

Figure 10:
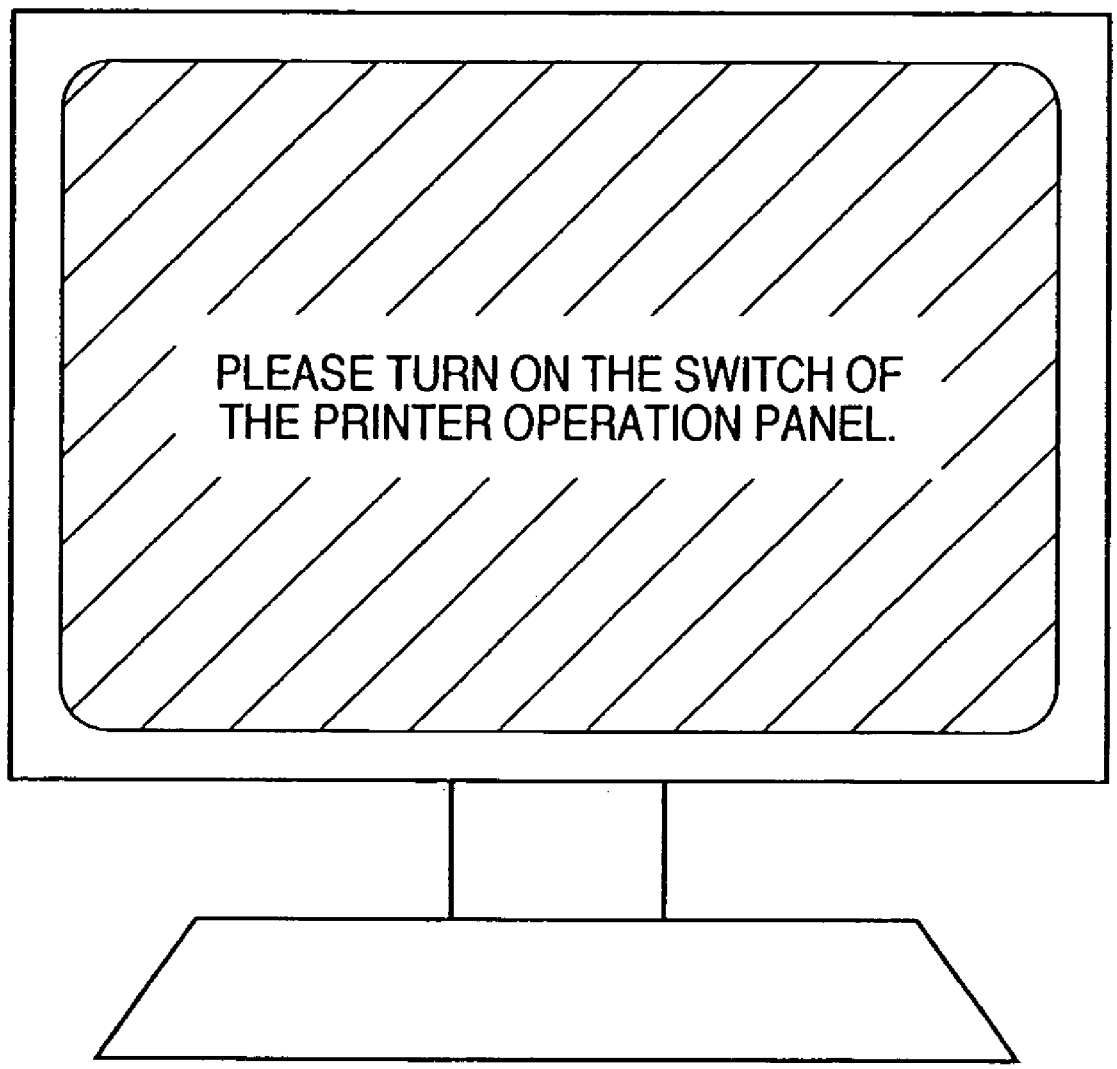
FIG. 10 is a view for explaining an example of a message which is displayed on the display of a client computer connected via a local interface means according to the second embodiment of the present invention.

When print data is supplied from an external apparatus connected via the local I/F 605 while the image process controller 601 is set in the deep sleep state, time-out occurs in the local I/F 605 because the local I/F controller 606 is OFF. The display of the connected external apparatus then displays a message "please turn on the switch of the printer operation panel". An example of this display is shown in FIG. 10. The display as shown in FIG. 10 may be provided when a port monitor for transmission of print data in the external apparatus detects that a local interface such as USB is associated, in addition to occurrence of time-out.

By displaying a message as shown in FIG. 10 that prompts recovery from deep sleep, PME issued in accordance with user operation to the operation display can be generated. Power saving of the local I/F controller 606 and supply of print data via the local I/F 605 can be smoothly performed. YES is determined in step S807 in accordance with an operation to the operation display.

As described above, the above embodiments can suppress power consumption of the network and local communication unit, and fulfill the network function of a printing apparatus in a printing system in which a plurality of external apparatuses are connected. The above embodiments can also implement a convenient environment even for an external apparatus connected to a local interface.

Consequently, a printing apparatus which realizes a stand-by power of 1 W can be achieved.

The relationship between FIG. 6 and the first embodiment will be explained.

(1) The image process controller 105 can correspond to the image process controller 601. In this case, the network interface card 104 is connected to the expansion I/F 612, the INT signal (dotted lines in FIGS. 1 and 4) in the first embodiment takes the same signal system as that of PME, and the input destination is set to the power switch circuit 617 in FIG. 6.

(2) As another form in which the network interface card 104 is connected to the expansion I/F 612, the network interface card 104 may shift to the deep sleep state.

In this case, the memory 204 which holds status information and the interface controller 201 receive power from a sub power supply, whereas the remaining blocks receive power from a main power supply. The interface controller 201 functions as the LAN I/F 609, LAN controller 610, MAC ROM 611, and power switch circuit 617 in FIG. 6.

The interface controller 201 performs the same determination process as those in step S808 of FIG. 8 and FIG. 9. If the interface controller 201 determines that a PME signal has been received, units such as the controller 202 and printer interface 205 in the network interface card 104 are powered on. Thereafter, the same process as that in FIG. 5 is executed to recover the image process controller 105 (which can also correspond to the image process controller 601 in FIG. 6) in S505. A recovery instruction signal in this case may be the INT signal in the first embodiment or PME in the second embodiment.

In this fashion, the embodiments can greatly save power even in a form in which the network interface card 104 is optionally connected.

As has been described above, the present invention can save power of a printing apparatus in a network system, and improve the convenience of the operator who wants to print from an external apparatus.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus comprising:
   a processor for performing image processing for print data externally received via a network;
   a network controller for controlling communication with an external apparatus via a network interface, wherein said network controller includes a monitoring unit which monitors reception of packet data from the external apparatus and detects a predetermined pattern included in the packet data, and a communication controller which transfers the packet data received via the network interface to said processor and responds to the external apparatus via the network interface; and
   a power controller for supplying power to said network controller and said processor in a first sleep mode, and stopping the power supply to said communication controller and said processor while continuing the power supply to the monitoring unit in a second sleep mode, wherein the first sleep mode is such that a printer engine is not supplied with sufficient power to operate in a normal mode, and wherein power consumption in the second sleep mode is lower than power consumption in the first sleep mode,
   wherein if said monitoring unit detects the predetermined pattern while in the second sleep mode of the power controller, said monitoring unit outputs an indication signal to said power controller to shift said power controller into the first sleep mode without shifting said power controller into the normal mode in which the printer engine has sufficient power to operate, and wherein said communication controller is activated by the power supply from the power controller and responds to a received status request from the external apparatus by transmitting status information while the power controller is in the first sleep mode.

2. The apparatus according to claim 1, wherein said monitoring unit detects a pattern of an SLP packet including an identifier indicating a search request.

3. The apparatus according to claim 1, wherein said monitoring unit detects a pattern of an SLP packet including an identifier used for power control.

4. The apparatus according to claim 1, further comprising:
   a second interface for communicating with the external apparatus and capable of outputting the indication signal to said power controller;
   wherein said power controller switches the sleep mode based on the indication signal from said second interface.

5. A control method for a printing control apparatus, wherein said apparatus comprises:
   a processor for performing image processing for print data externally received via a network,
   a network controller for controlling communication with an external apparatus via a network interface, wherein said network controller includes a monitoring unit which monitors reception of packet data from the external apparatus and detects a predetermined pattern included in the packet data, and a communication controller which transfers the packet data received via the network interface to said processor and responds to the external apparatus via the network interface, and
   a power controller for supplying power to said network controller and said processor in a first sleep mode, and stopping the power supply to said communication controller and said processor while continuing the power supply to the monitoring unit in a second sleep mode, wherein the first sleep mode is such that a printer engine is not supplied with sufficient power to operate in a normal mode, and wherein power consumption in the second sleep mode is lower than power consumption in the first sleep mode,
   wherein the method comprises:
   outputting, by said monitoring unit, an indication signal to said power controller to shift said power controller into the first sleep mode without shifting said power controller into the normal mode in which the printer engine has sufficient power to operate, if said monitoring unit detects the predetermined pattern while in the second sleep mode of the power controller; and
   activating said communication controller by the power supply from the power controller, and responding with the communication controller to a received status request from the external apparatus by transmitting status information while the power controller is in the first sleep mode.

6. The method according to claim 5, wherein said monitoring unit detects a pattern of an SLP packet including an identifier used for a search request.

7. The method according to claim 5, wherein said monitoring unit detects a pattern of an SLP packet including an identifier used for power control.

8. The method according to claim 5, wherein said apparatus further comprises:

a second interface for communicating with the external apparatus and capable of outputting the indication signal to said power controller, and wherein said method further comprises:

switching the sleep mode with the power controller, based on the indication signal from said second interface.

9. A computer-exectuable program stored on a computer-readable medium, for causing a computer to implement a control method for a printing control apparatus, wherein said apparatus comprises:

- a processor for performing image processing for print data externally received via a network,
- a network controller for controlling communication with an external apparatus via a network interface, wherein said network controller includes a monitoring unit which monitors reception of packet data from the external apparatus and detects a predetermined pattern included in the packet data, and a communication controller which transfers the packet data received via the network interface to said processor and responds to the external apparatus via the network interface, and
- a power controller for supplying power to said network controller and said processor in a first sleep mode, and stopping the power supply to said communication controller and said processor while continuing the power supply to the monitoring unit in a second sleep mode, wherein the first sleep mode is such that a printer engine is not supplied with sufficient power to operate in a normal mode, and wherein power consumption in the second sleep mode is lower than power consumption in the first sleep mode, wherein the method comprises:

outputting, by said monitoring unit, an indication signal to said power controller to shift said power controller into the first sleep mode without shifting said power controller into the normal mode in which the printer engine has sufficient power to operate, if said monitoring unit detects the predetermined pattern while in the second sleep mode of the power controller; and activating said communication controller by the power supply from the power controller, and responding with the communication controller to a received status request from the external apparatus by transmitting status information while the power controller is in the first sleep mode.

* * * * *